UNITED STATES PATENT OFFICE.

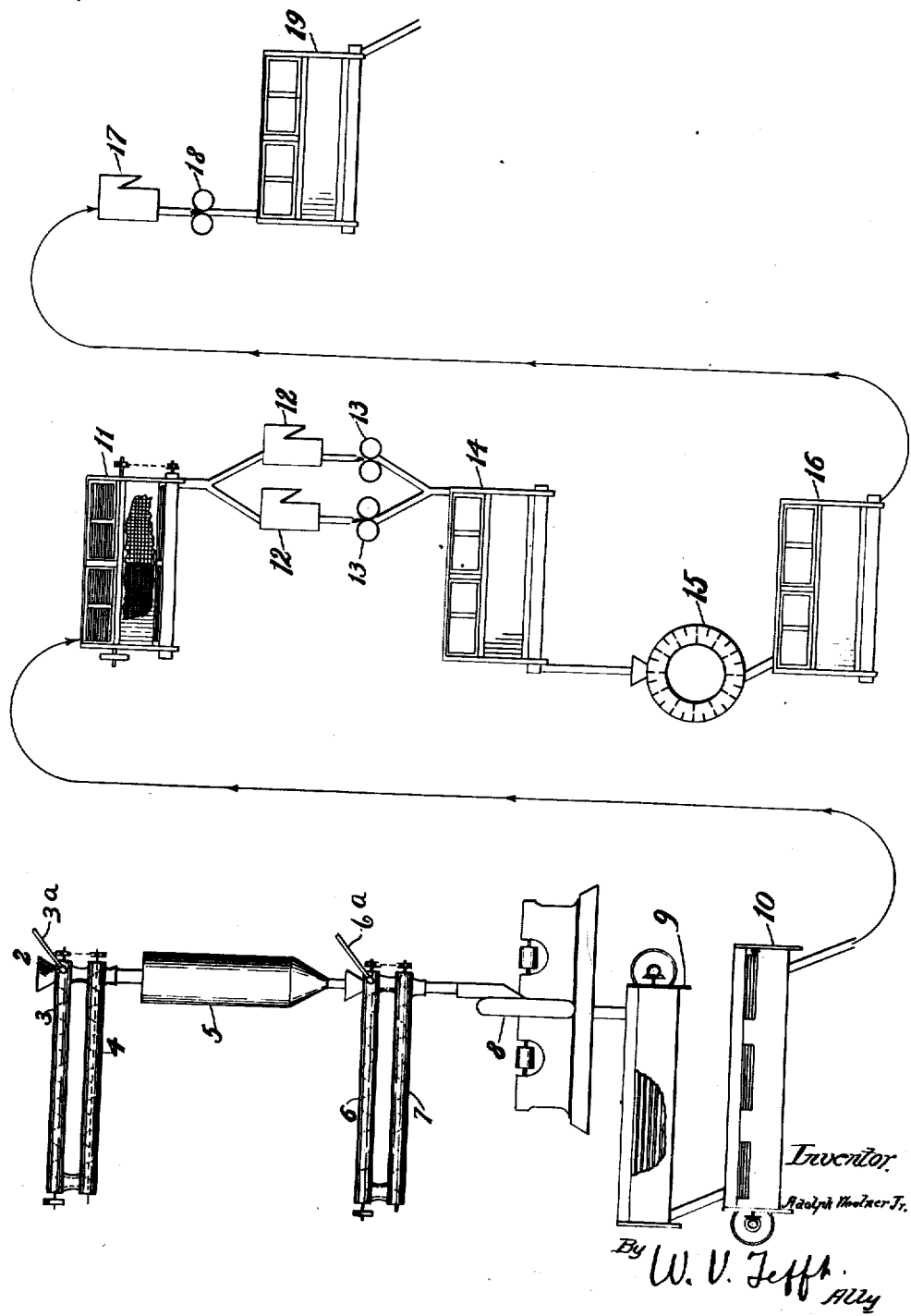

ADOLPH WOOLNER, JR., OF PEORIA, ILLINOIS.

PROCESS FOR TREATING CORN.

1,258,076.

Specification of Letters Patent.

Patented Mar. 5, 1918.

Application filed November 22, 1916. Serial No. 132,867.

*To all whom it may concern:*

Be it known that I, ADOLPH WOOLNER, Jr., a citizen of the United States, residing at Peoria, in the county of Peoria and State of Illinois, have invented certain new and useful Improvements in Processes for Treating Corn, of which the following is a specification.

My invention relates to a process for separating the germs from corn.

In following out my improved process, I have, of course, the general object in view of separating the germs from the starch properties and the elimination of the hulls from both products, that is, the starch and the germs.

My invention is specially directed to a method of treating the grains of corn that will at an early stage of its treatment eliminate a large proportion of the hulls.

A further important object of my invention is to so treat the grain and the starch product resultant therefrom that the germs shall not be ground, lacerated or crushed except that at the latter end of the process they are flattened to facilitate separation from the starch substances.

My invention includes such treatment of the products, that is, starch and germ, that they will be entirely free from foreign substance as, for instance, bran, meal or small grits.

The mechanism employed to carry out my process is so closely related to that which is commonly employed in many milling operations and is so thoroughly understood, that I shall not refer fully to detailed structures of machines, except with respect to the hulling element, or machine, but by the diagrammatic illustrations presented in the drawing herein I shall attempt to exemplify the different steps in a somewhat general way.

Referring then to the drawing, 2 is a bin or receptacle adapted to serve as a supply for corn to be treated. 3 and 4 refer generally to a moistener, the same comprising tubular members within which, respectively, are disposed oppositely acting auger members. The grain is designed to be fed into the moistener, and water is supplied thereto, in quantities as may be desired, through and by suitable supply means indicated at 3ª. In moistening the contents either cold or hot water may be used or steam.

5 is a swelling tank, to which the grain from the moistener passes. Tank 5 is formed with such restriction at its outlet end that the gravity flow therefrom is so gradual that the grain will remain therein a sufficient length of time to facilitate proper swelling thereof.

6 and 7 are connected tubular members, in structure form and operative function, the same as that of the moistener. Steam is designed to be passed through the steamer members for the purpose of heating the grain being passed therethrough. There being provided a proper supply connection indicated at 6ª to accomplish the purpose.

From the steamer the grain passes to a hulling machine 8 which comprises a case and two oppositely driven disks and, of course, proper driving connections therefor. The inner faces of the disk members of the huller are corrugated on lines extending from their axes to their circumferences, and the disks are spaced, relatively a sufficient distance to permit the grain to pass therethrough, but at the same time, having a sufficiently impinging action upon the grain kernels to break the hulls and in the main, to separate them from the body of the grain. This hulling action also serves to a considerable degree to separate the germs from the starch body (hereafter referred to as the endosperm.)

From the huller the mass of disintegrated parts passes to the drier 9. This drier may be of any suitable character so long as it has the efficiency or capability of drying the products.

From the drier the materials are passed to cooler 10, which said cooler similarly may be of any structural and operative character so long as it possesses the efficiency for cooling the grain.

The drying and cooling operation are serviceable to render the endosperm dry and brittle to facilitate operations in furtherance of the process.

The germ, being largely of an oil constituency still, remains in its natural, rather soft, state as it is not as amenable to hardening as the very coarse starch or endosperm and hull constituency of the mass.

From the cooler the mass of materials, resulting from former operations, are passed to reel 11. This reel may be of any efficient mechanical structure and nature. In the reel meal and grits produced by former operations are removed. From the reel materials are passed to an aspirator or aspirators as at 12 and, in this treatment of the materials, the loose hulls are removed.

From the aspirators the materials are passed to a pair of rollers as 13, said rollers being properly spaced, relatively, to crack the endosperm parts of the mass without grinding the germ.

From the rollers the materials are passed through reel 14, which operation serves to sift out the meal and grits resulting from the roller operation.

From the reel, materials are passed to rubbing machine 15, said rubbing machine, in practice, comprising relatively arranged and oppositely acting disk members provided with lugged faces, which rubbing machine in action serves to finally loosen any hulls that have adhered to the germ and endosperm, following the aspirating treatment.

From the rubbing machine materials are passed to reel 16, wherein there is a further elimination of meal and grits.

From reel 16, the materials are passed to aspirator 17, within which any remaining hulls are removed.

From the aspirator the mass, comprising endosperm particles and germ, now fully cleaned of hulls and other foreign matter of every character, is passed to rollers 18, for final reduction. The action of these rollers reduces the endosperm particles to very small size. The rollers are set, relatively, so as to effect the final reduction of the endosperm and also to flatten the germ, without lacerating or grinding the same. Such flattening effect of the germs being of service to facilitate their separation from the endosperm particles in the final and following step of the process.

From the rollers the fine particles of endosperm and the flattened germs are passed to reel 19 wherein the endosperm particles are entirely sifted from the mass and the loosened germ is passed, clean and free from all foreign matter, to a waiting receptacle.

What I claim is:

1. The process of degerminating which consists in subjecting the corn to a moistening treatment to destroy the adhesion of the hull and germ to the starch portion, then tearing the hull and germ from the starch portion in a moistened condition, then drying the entire mass to reduce the starchy portions to a brittle condition, then separating the hulls from the mass by aspiration and the starchy portions from the mass by reduction and sifting subsequent to the drying operation.

2. The process of degerminating which consists in moistening the corn, then swelling the corn and destroying the adhesion of the hull and germ to the starch portion of the corn by retaining the corn in a moistened condition for a predetermined period of time, then loosening the hull and germ from the starch portion of the corn in its swollen condition by attrition, then drying the resultant mass to reduce the starch portion to a brittle condition, then removing the hulls from the mass by aspiration and removing the starchy portion by grinding and sifting subsequent to the aforesaid drying of the mass.

3. The process of degerminating which consists in moistening the corn, retaining the corn in its moistened condition in a container so as to swell the corn and destroy the adhesion of the hull and germ to the starch portion of the corn, tearing the hull and germ loose from the starch portions of the corn in its swollen condition by attrition, then drying the mass and separating the hulls by aspiration and the starch portion by a gradual reduction and sifting subsequent to the drying operation.

4. The process of degerminating which consists in steaming the corn, then retaining the steamed mass of corn in a container for sufficient period of time to swell the corn, then resteaming the swollen corn, then tearing loose the hull and germ from the starch portion of the corn, then separating the hulls and starch portions from the germ.

5. The process of degerminating which consists in initially extracting the hull and larger portions of the germ from the corn in a moistened condition, then drying the corn to reduce the starch portion to a brittle condition, then removing the hulls and starch portion subsequent to the drying operation by gradual reduction and separating the residue germ portions from the starch and hull portions by a rubbing operation interposed in the gradual reduction process.

6. The process of degerminating which consists in moistening the corn, then loosening the hull and larger portions of the corn from the germ while in a moistened condition, then drying the corn to eliminate the moisture therefrom, then cooling the corn to reduce the starch portions to a brittle condition, then removing the hull and starch portion subsequent to the drying and cooling operation by aspiration, gradual reduction and sifting.

7. In a germ extracting apparatus, the combination of means for moistening the mass of grain, means for extracting the larger portions of the hull and germ from the grain, a grain drying mechanism for eliminating the moisture from the corn, grain cooling means for reducing the starch portion of the grain to a brittle condition and means for eliminating the hulls and starch portion from the germ subsequent to the operation of the cooling mechanism thereof, said means consisting of aspirating mechanism, rolling mechanism and sifting mechanism.

8. In a germ extracting apparatus, the combination of a pair of moisteners, a swelling tank, means for delivering material from one of said moisteners to the swelling tank and means for delivering material from the swelling tank to the other of said moisteners, a mill having means for carrying material from the second mentioned moistener to the mill, said mill being provided with reversely operating members for tearing the hull and germ from the starch portion of the grain, a drier and means for delivering the material from the mill to the drier.

In testimony whereof I affix my signature.

ADOLPH WOOLNER, Jr.